Inventors:
William Miller,
Harold Thomas Lamb.
by their Attorney:

Inventors:
WILLIAM MILLER,
HAROLD THOMAS LAMB.

Patented Sept. 15, 1931

1,823,113

UNITED STATES PATENT OFFICE

WILLIAM MILLER, OF DUNSTON-ON-TYNE, AND HAROLD THOMAS LAMB, OF NEW-CASTLE-ON-TYNE, ENGLAND

FREE WHEEL CLUTCH FOR MOTOR VEHICLES AND THE LIKE

Application filed January 23, 1929, Serial No. 334,461, and in Great Britain January 28, 1928.

This invention consists in an improved free-wheel clutch for motor vehicles and the like, and has for its object to provide a free-wheel clutch of the ball or roller friction type which will be of simple construction and have a more flexible action than has hitherto been the case. Another object is to provide foolproof means whereby the clutch may be rendered bi-directional at will without the use of dog clutches or other positive engaging means.

According to the invention, the engaging means between the faces of the driving and driven clutch members comprise slidable wedging means having a pair of oppositely-disposed wedge surfaces contacting on one side with one of the clutch members and on the other side with rolling means carried in a common member, one or other of said wedge surfaces being engaged according to whether the engine shaft or the propeller shaft is driving, while means are provided for controlling the wedging means so that the clutch may be rendered uni- or bi-directional at will.

The invention will now be described with reference to the accompanying drawings which show various examples of construction of the free-wheel clutch according to the invention. In the said drawings.

Figure 1:
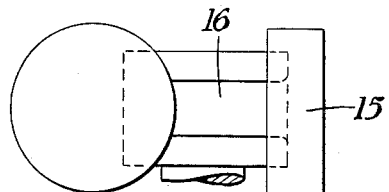
Fig. 1 is a plain view partly in section and partly in elevation of a form of construction comprising a clutch.
Figure 1:
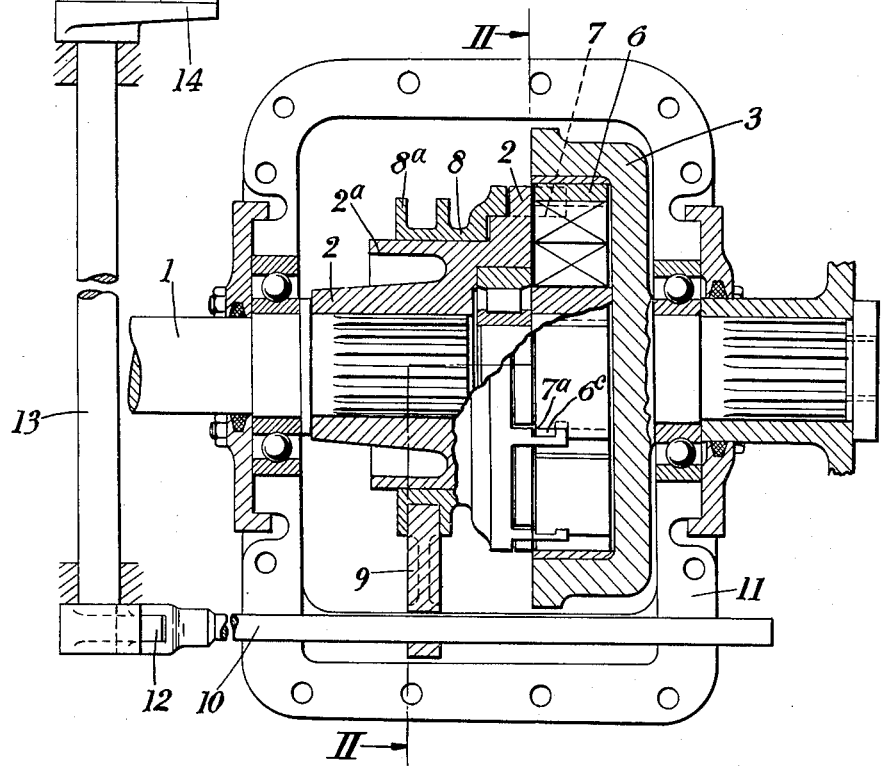
Figure 2:
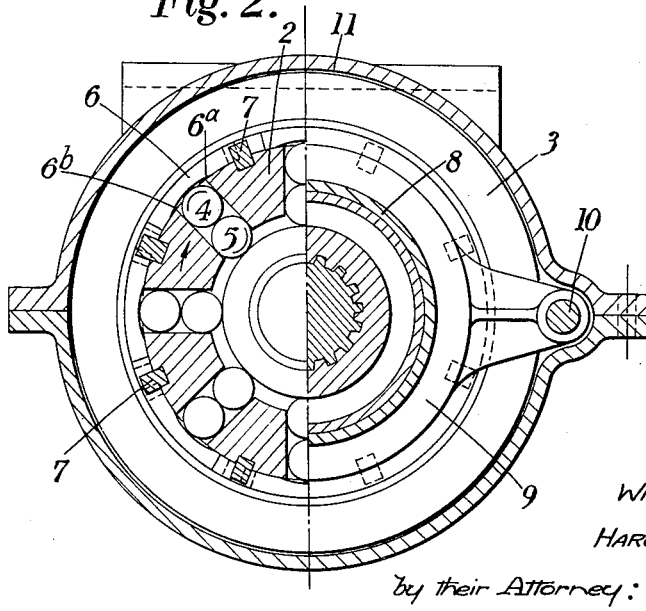
Fig. 2 is a cross-section of Fig. 1, the left-hand portion of which is taken on the line II—II and the right-hand portion on the line IIa—IIa of Fig. 1.

Referring more particularly to Figs. 1 and 2 of the drawings, 1 indicates an extension of a gear box tail shaft on which is rigidly mounted one of the clutch members 2. The numeral 3 indicates the other clutch member which is of channel section, and 4, 5 the pairs of rollers, the rollers 4 contacting with double-acting wedges 6. Grooves are formed in the clutch member 2 between the wedges, and in each of the said grooves there is a laterally slidable stop 7—laterally, that is to say, relatively to the movement of the wedges. Each of the stops 7 is rigidly secured at one end to a slidable sleeve 8 mounted on an extension 2a of the driving clutch member 2, and having a grooved collar 8a for engagement with a yoke 9 connected to a shifter rod 10 controllable from the driver's seat.

The clutch is mounted on ball bearings in a cage 11. The shifter rod is supported in a lateral extension of the cage 11, and is connected to an arm 12 mounted on the one end of a rocker shaft 13 having at its other end a lever arm 14 with a projecting handle 15, which serves for actuating the shifter rod. The handle 15 is preferably arranged in the path of the gear changing lever 16 in such a manner that when the gear lever goes into the reverse position it will abut against the handle 15 and operate the control. The operating lever 14 and gear lever 16 with their associated parts are shown semi-diagrammatically.

The wedges 6 are so formed in relation to the stops 7 that, under normal running conditions, when the engine clutch member is driving, the rollers 4, 5 coact with one set of wedge surfaces 6a, the wedges taking up the position shown in dotted lines in Fig. 2, and engagement of the clutch members occurs; while when the vehicle is over-running the engine, the wedges 6 are moved out of the one engaging position until they abut against the stops 7, with the neutral portions of the wedges presented to the rollers 4, 5; the clutch thus disengages, and the vehicle free-wheels.

When it is desired to use the engine as a brake, the stops 7 are withdrawn from engagement with the ends of the wedges by moving the rod 10 to the left, with the result that the said wedges are now free to move past the neutral position from which they tend to be moved by the member 3 when it takes the drive as a result of the vehicle over-running the engine, for example, when coasting down hill, and thus turns at a greater velocity than the member 2. The further result is that the wedges and rollers again coact, but at the wedge surfaces 6b instead of at the surfaces 6a which came into operation when the engine was driving. The clutch may now be said to be bi-directional; that is to say, engagement takes place for either direction of turning of either of the clutch members. It will be noted that as the wedges 6 have now moved past the ends of the withdrawn stops 7, the latter cannot be moved back to their position in the path of the wedges, for the ends of the stops will abut against the sides of the wedges. It will therefore be impossible to return to the unidirectional condition until the engine again takes the drive and thus causes the member 2 to turn at a greater velocity than the member 3 and so carry the wedges back from the position of engagement with the rollers at their faces 6b, through the neutral position to engagement with the rollers at their faces 6a. This movement brings the wedges out of the path of the stops 7 which may now be restored to their original position and so cause the clutch to become once more uni-directional. The free-wheel feature thus remains cut out until the vehicle is again under control, the device thus being rendered fool-proof.

Owing to the relatively large area of the surfaces of the wedges remote from the wedge surfaces, a quantity of oil has first to be squeezed out from between the wedges and the corresponding clutch face, before full engagement of the clutch can take place, and consequently a certain amount of slip takes place as the clutch is made to engage. This is beneficial and gives an elastic engagement free from jar, so that engine braking and "take-up" by the engine after a free-wheeling period may be brought into operation instantaneously for average speeds without straining any of the parts.

Interlocking means are provided on the stops 7 and the wedges 6 to prevent the sudden use of the engine as a brake when the former is running at a lower speed than the member 3, which sudden use would involve in most circumstances a too-rapid speeding up of the engine by the member 3 which is in driving relation with the rear transmission mechanism, with resulting damage. The said interlocking means are formed as follows:—Each of the stops 7 has a recess at 7a which is adapted to receive a projection 6c on the adjacent edge of its coacting wedge 6 when the wedges abut against the stops during free-wheeling. Hence, during free-wheeling, viz., when the vehicle is over-running the engine, and the member 3 is turning faster than the member 2 in the direction of the arrow (Fig. 2), the stops 7 cannot be withdrawn. Not until the engine takes the drive and the member 2 tends to turn at a greater velocity than the member 3, so that the projections 6c move out of engagement with the recesses 7a, will it be possible to withdraw the stops 7. Hence, in the event of it being desired to use the engine as a brake when the vehicle is coasting down hill, it will first be necessary to accelerate the engine until it is running at a corresponding speed greater than that of the vehicle. Then, and not before, the stops 7 can be withdrawn, after which the engine can be slowed down to function as a brake. Thus the device is further rendered fool-proof.

If desired, one roller only may be used with each wedge. In this case the engaging and disengaging action will not be so free as with an even number of rollers for each roller unit, but as the action is only occasional, this is not a serious drawback.

Figure 3:
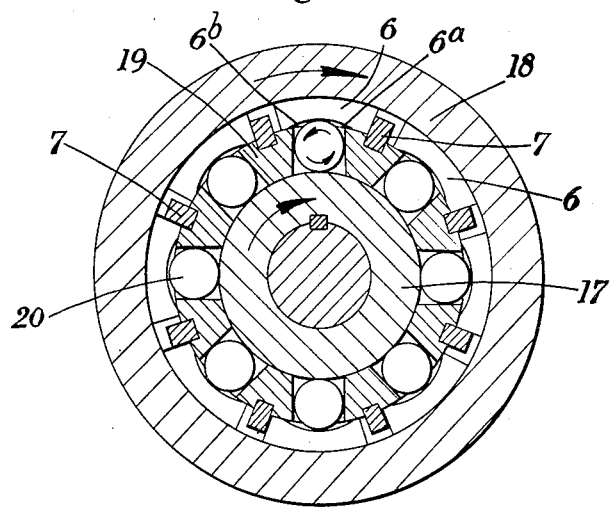
Fig. 3 is a cross section of a form of construction wherein one roller only is used with each wedge.

Fig. 3 shows an alternative construction in which the inner member 17 with which the rollers engage constitutes one clutch member, and the member 18 with which the wedges engage constitutes the other clutch member, the roller-carrying member—which, in the previous construction, was also one of the clutch members—taking the form of a floating cage 19 which carries the slidable stops 7. In this form each roller unit preferably comprises one roller 20.

The operation of this clutch is as follows:— Assume the member 17 is the driving member and rotates in the direction of the arrow. The rollers 20 will tend to turn in the direction indicated by the two arrows and to ride up the faces 6a of the wedges 6 which tend to lag behind, pressing the wedges outwards so that the member 18 is driven. When the member 18 overruns the member 17 and becomes the driver, the wedges 6 are carried with it until they abut against the stops 7, at which point the narrowest portions of the wedges have been brought opposite the rollers so that pressure is taken off and the member 19, with the rollers, wedges and stops, floats.

When the clutch is to be made "fixed," the stops 7 are withdrawn, as in the construction described with reference to Figs. 1 and 2. Then when the member 18 overruns, the wedges 6 will now move past the neutral position and engage the rollers, which will move in the opposite direction to that indicated and the member 17 will be driven.

Figure 4:
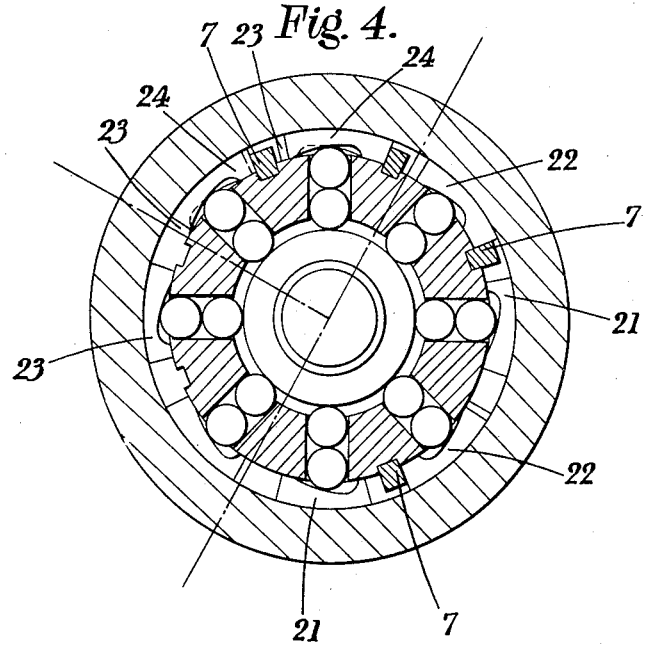
Fig. 4 is a cross section showing two alternative forms of clutch wherein pairs of oppositely-disposed single-acting wedges are used instead of double-acting wedges.

In all the above constructions, instead of using double acting wedges, pairs of wedges having their wedge surfaces oppositely disposed may be associated with each roller unit, the slidable stops coacting with one set of wedges only. Fig. 4 shows in section two alternative arrangements of this form of construction.

On the right of the diametral chain line in Fig. 4 a clutch is shown wherein one set of alternate roller units coact with single acting wedges 21, and the other set coact with single acting wedges 22 having their wedge faces oppositely disposed to those of the wedges 21; so that with this arrangement free-wheeling is effected through one set of wedges, and fixed drive through the other set. In the present case the wedges 21 are for free-wheeling, and the wedges 22 for fixed drive. The sliding stops 7 are therefore only necessary for the wedges 22.

On the left of Fig. 4 an arrangement is shown wherein two oppositely disposed single acting wedges 23, 24 are associated with each roller unit, the said wedges being arranged side by side. The wedges 23 are for free-wheeling and the wedges 24 for fixed drive. The stops 7 are arranged to project into the path of the fixed drive wedges 24 only, as shown in the lower portion of the left side of Fig. 4 which is a sectional view taken on a plane between the two sets of wedges.

The operation of these two forms of clutches is similar to that of the clutch shown in Figs. 1 and 2, with the difference that the slidable stops are used for half the wedges only, while in the first mentioned construction—that shown to the right of Fig. 4—half the number only of the roller units are in use at the same time.

We claim:—

1. In a free-wheel clutch for motor vehicles and the like, the combination of two concentric and co-planar cylindrical members, the adjacent faces of which constitute clutch faces, slidable wedging means between the said clutch faces comprising a pair of oppositely inclined wedge surfaces, said wedging means being adapted to contact on one side with one of the clutch faces, rolling means, a common member carrying said rolling means, the said rolling means being adapted to contact with the other clutch face and with the said oppositely-inclined wedge surfaces of the wedges, and means for controlling the position of the wedging means so as to render the clutch uni- or bi-directional at will.

2. A free-wheel clutch according to claim 1, wherein the wedge-controlling means comprise abutment means slidably mounted on the roller-carrying member and adapted to be brought into or out of the path of the wedging means so as to render one of the wedge faces inoperative or operative.

3. A free-wheel clutch according to claim 1, wherein the wedge-controlling means comprise abutment means slidably mounted on the roller-carrying member and adapted to be brought into or out of the path of the wedging means so as to render one of the wedge faces inoperative or operative, in combination with interlocking means on said abutment means and wedging means which are adapted to coact in such a manner that when the wedges abut against the abutment means the said wedges and abutment means are positively interlocked and withdrawal of the latter is prevented.

4. A free-wheel clutch according to claim 1, wherein the wedge-controlling means comprise abutment means slidably mounted on the roller-carrying member and adapted to be brought into or out of the path of the wedging means so as to render one of the wedge faces inoperative or operative, the abutment means having a recess and the wedging means having a corresponding projection, which recess and projection are adapted to interengage in locking relation when the wedging means abut against the abutment means and thus prevent withdrawal of the latter.

5. A free-wheel clutch according to claim 1, comprising in combination a grooved collar slidably mounted on the roller-carrying member, abutment means mounted on said grooved collar, and means adapted to be brought into or out of the path of the wedging means so as to render one of the wedge faces inoperative or operative.

6. A free-wheel clutch according to claim 1, wherein the wedging means comprise double-acting wedges.

In witness whereof we have signed this specification.

WM. MILLER.
HAROLD T. LAMB.